United States Patent Office 3,293,687
Patented Dec. 27, 1966

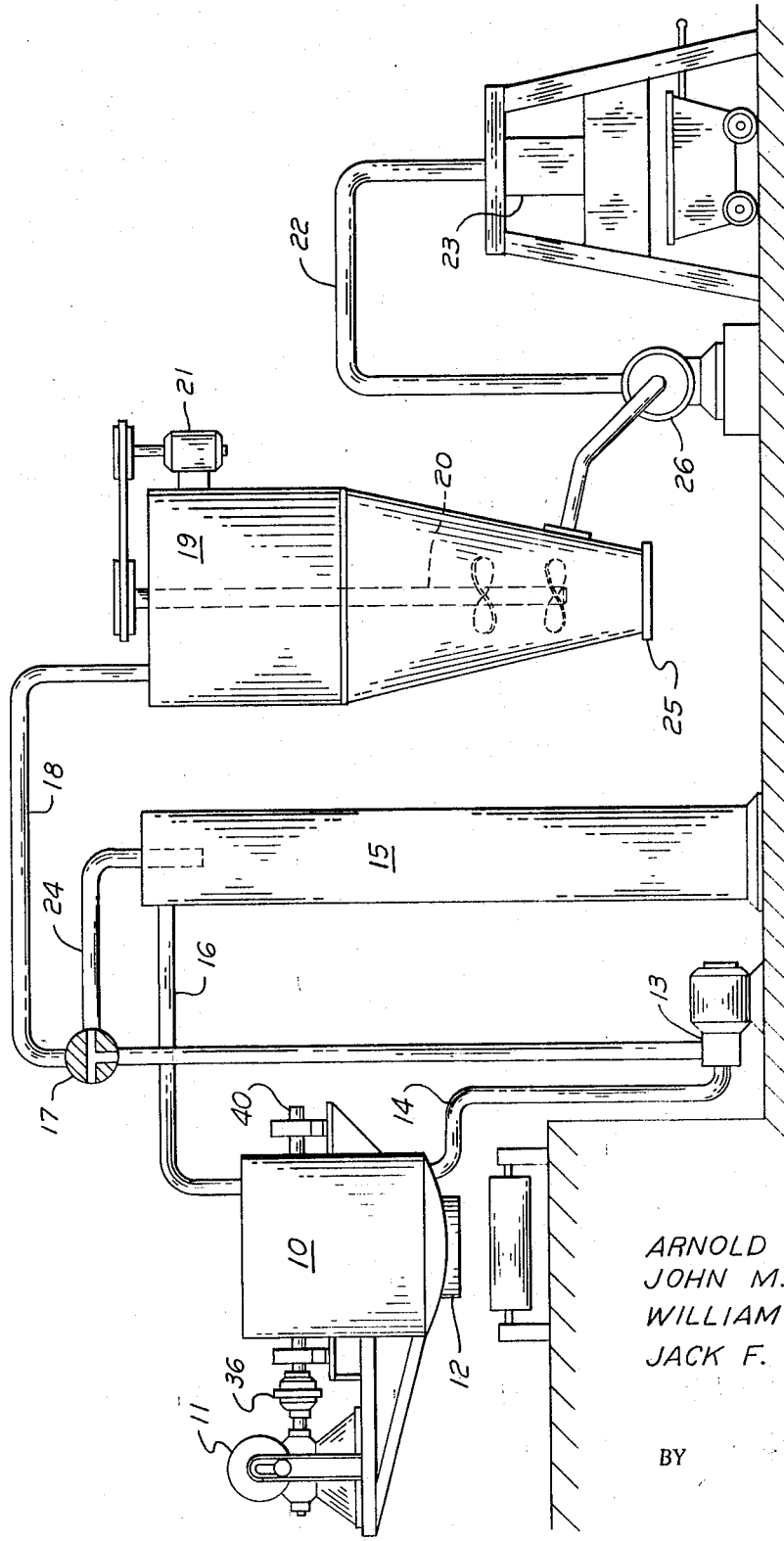

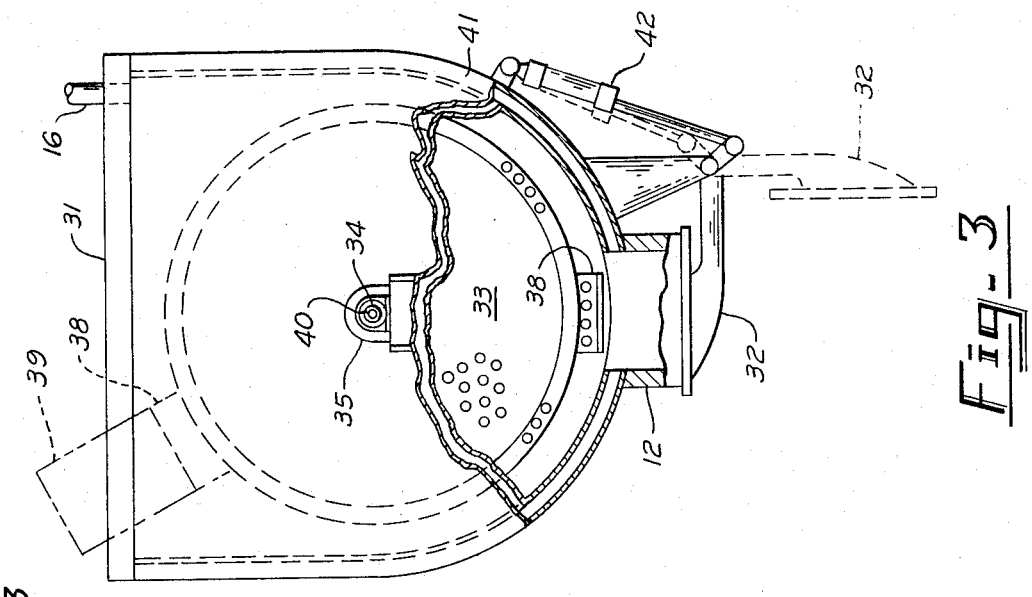
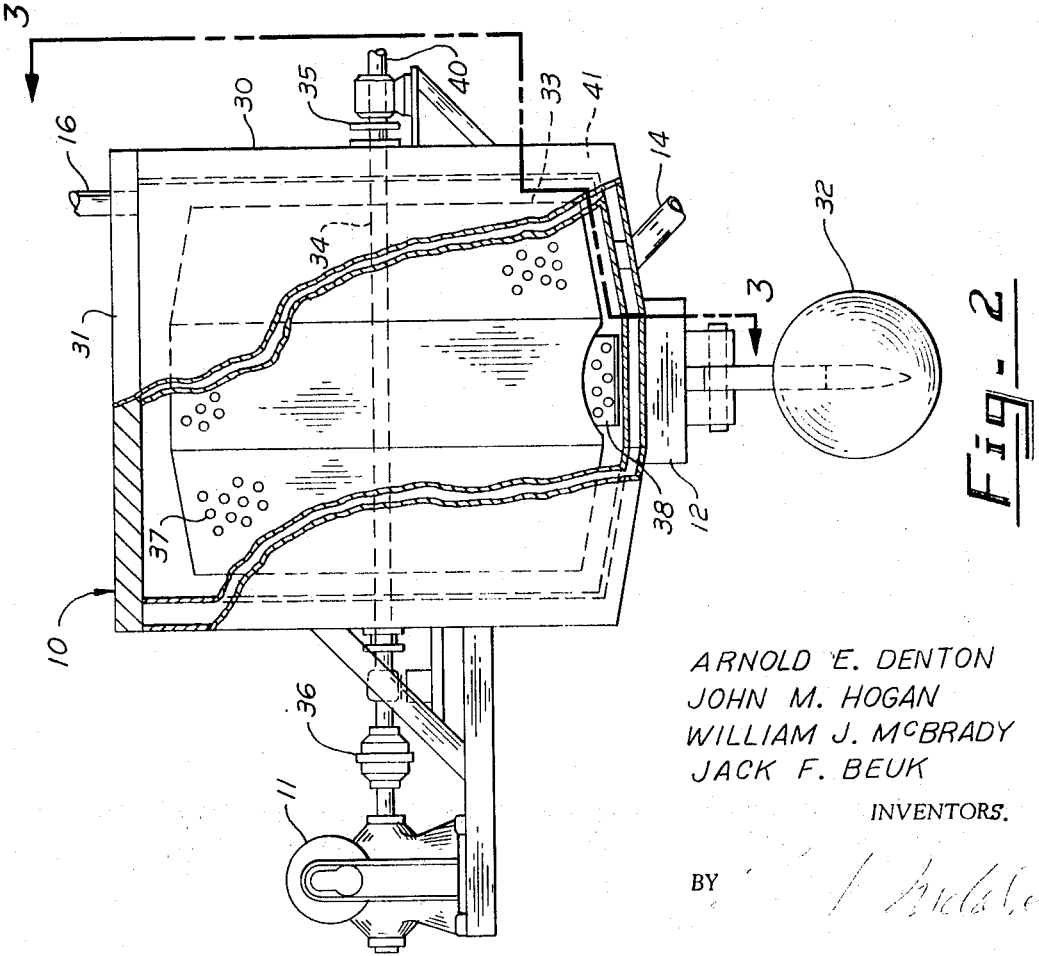

3,293,687
ENZYMATIC REMOVAL OF MEAT FROM BONES
Arnold E. Denton, Moorestown, N.J., John M. Hogan, Orono, Maine, and William J. McBrady, Hazelcrest, and Jack F. Beuk, Hinsdale, Ill., assignors to Swift & Company, Chicago, Ill., a corporation of Illinois
Filed May 5, 1965, Ser. No. 453,462
3 Claims. (Cl. 17—1)

This is a continuation in part of our prior co-pending application S.N. 232,636, filed October 1, 1962, now abandoned, which is a division of our application S.N. 25,273, filed April 28, 1960, now Patent No. 3,098,014.

This invention relates to the recovery of meat from bones and more particularly to an improved method for treating meat products to separate the bone and cartilaginous material from meat.

In the preparation of animal carcasses for the marketing of meat derived from such carcasses, it is difficult and expensive to remove all of the meat from the animal bone, and a certain amount of meat is usually left on the bones because the cost of removing the last small pieces is prohibitive. Therefore, a certain amount of the meat is left on the bone and is, to a large degree, wasted since it is sold at a lower price as part of the bone rather than as meat. Furthermore, many animal parts are of a size and shape which renders meat removal from the bones very difficult because of the lack of adaptability to machine and other rapid processing techniques. With such parts it is often necessary to resort to hand labor for the boning step. Hand boning represents a slow and costly operation resulting in a higher cost product than can be prepared by rapid mechanized techniques.

It is, therefore, an object of this invention to provide an improved apparatus for recovering meat from bones in a more rapid and efficient manner than has been proposed heretofore.

Another object of the invention is the provision of an improved apparatus for obtaining an improved yield of meat of desirable flavor and texture from bones having meat attached thereto.

Still another object of the invention is the production thereby of a meat product having a desirable texture not ordinarily associated with meats obtained by mechanical removal means.

Additional objects, if not specifically set forth herein, will be readily apparent to those skilled in the art from the detailed description and drawings which follow.

Generally, the invention comprises a system of apparatus for carrying out a combined chemical-mechanical process for freeing animal flesh from the skeletal parts to which such flesh is attached, the method being free of the limitations ordinarily imposed by shape of the body part, percentage of meat on the bone, etc. The method and apparatus is applicable to such fowl parts as necks, backs and wings, which are considered difficult to handle because of size and shape. Additionally, the bones of livestock such as cattle, sheep and hogs which have been boned by hand and carry only small pieces of meat can be treated by the present method to recover a large portion of the meat free from the bone. The system of apparatus comprises an agitator means for subjecting the meat-carrying bones to the action of proteolytic enzymes to at least partially release the meat from the bone, and a rolling mechanical action which, when combined with the enzyme treatment, results in a substantially complete separation of bone-free meat from skeletal parts substantially cleaned of meat. The agitator is connected, by piping and suitable pump and valve means, to both a settling means and a separating means for cycling the enzyme treated material through the agitator means and settling means before finally treating the material in the separating means. The method and apparatus have application to parts of meat-bearing animals such as cattle, sheep, calves, hogs, poultry, turkeys and other animals providing flesh meat consumed by humans.

In the drawings, FIGURE 1 is a diagrammatic elevation view of an apparatus system of the present invention;

FIGURE 2, is a detail side elevation, with certain parts broken away, of a portion of the apparatus shown in FIGURE 1 constituting a tank and agitator device; and FIGURE 3, is an end view of that portion of the apparatus shown in FIGURE 2 with certain parts broken away and shown in section.

More specifically, it is within the contemplation of this invention to remove meat from bones to which it is attached by subjecting a mixture of the meat-bearing bones and a proteolytic enzyme to an elevated temperature while the bones are agitated. The combined action of the enzyme on the connective tissue holding the meat to the bone and the mechanical action which causes the bones to be moved with respect to one another and with respect to the solution carrying the enzyme results in a surprisingly efficient separation of the meat and bone. Moreover, a very attractive, palatable meat results since the heating required to facilitate enzyme action is much less than that which is necessary in cooking the product to cause the meat to shrink away from the bone. Cooking of the meat and bones at a high temperature, or for a long period of time at a moderate temperature, tends to deleteriously affect the flavor and general attractiveness of the product. When the enzyme has been permitted to act to a sufficient degree, the mixture is subjected to an enzyme inactivation step in order to halt enzyme action and prevent objectionable peptonization. The bones are then separated from the detached meat and the meat product is recovered as a striated tissue rather than as a solution or suspension of small particles, as would be the case if excessive enzymatic action were permitted.

Proteolytic enzymes are utilized in the process for facilitating removal of the attached meat. Any one or more of various proteolytic enzymes, singly or in combination, which are effective at a pH from about 4.0 to 7.0 may be employed in carrying out the invention. Proteolytic enzymes of plant origin, proteolytic enzymes of animal origin, and proteolytic enzymes derived from bacterial or fungal sources which preferentially attack connective tissue at the temperatures employed are suitable for this purpose. Papain, ficin, and bromelin are desirable plant-derived proteolytic enzymes, while animal-derived proteolytic enzymes include trypain, pancreatin and chymotrypain. Typical proteolytic enzymes derived from molds such as *Aspergillus oryzac, Aspergillus alliaceus,* and *Aspergillus wentii* may also be employed in the process.

Bacterially-derived enzymes are those isolated from the overall culture of bacterial organisms such as *Bacillus mesenteroides, bacterium subtilis,* and *Clostridium welchii.* Of the various enzymes which may be employed in the process, those proteolytic enzymes of plant origin are preferred.

The quantitiy of enzyme employed in the process is variable and depends upon several factors such as the type and activity of the enzyme, the type of animal bones being treated, the time of heating and the temperature to which the enzyme-meatbone mixture is heated. Usually where enzymes of plant origin are employed, the quantity of enzyme required to obtain release of the meat from the bone will be about 5–150 mg. enzyme/pound of meat and bone. Fungal enzymes in amounts of about 10–600 mg. enzyme/pound of meat and bone may be used, while larger amounts around 10–1500 mg. enzyme/pound of meat and bone of the bacteria-derived enzymes can be employed.

Generally, as the amount of a given enzyme employed in the process is increased, the time and temperature of heating can be decreased and equivalent results obtained. Also, heating at temperatures at the high end of the temperature range of enzyme activity coupled with vigorous agitation permits the use of smaller amounts of enzyme.

After heating the mixture of enzyme and meat-containing bones under vigorous agitation for a time sufficient to initiate efficient removal of the meat, the temperature of heating is increased to about 205–215° F. or above to complete the processing and to inactivate the enzyme. Agitation of the mixture is then stopped and bone particles are permitted to settle-out. The slurry of meat and water is removed from the separated bones and the meat slurry is subjected to centrifugation or other separation technique to remove the striated meat pieces from the water.

Ideally it is desired to promote enzyme activity specifically directed to the breakdown of collagen and elastin as distinguished from activity on muscle fiber inasmuch as the connective tissue holding the meat to the bone is primarily collagen and elastin. Enzyme action on the muscle fiber making up the bulk of the heat should be held to a minimum although, in some cases, the tenderizing action of the enzyme on the muscle fiber may be desirable. Therefore, the specific enzyme and the treating temperature should be selected so as to insure a maximum of enzyme activity on the collagen and elastin and a minimum enzyme activity on muscle fiber. It has been found in a study of the atcivity of certain enzymes on collagen and on muscle fiber that the majority of the proteolytic enzyme preparations exhibit greatest proteolytic action on collagen and elastin at slightly higher temperatures than the temperatures at which maximum activity on muscle tissue occurs. Also, the temperature ranges of optimum collagen and elastin activity and optimum muscle fiber activity overlap. It can be stated generally that while some enzyme action takes place at temperatures of about 100° F.–190° F., the greatest activity of a given enzyme on collagen takes place in the range 130–180° F. while the greatest activity of the same enzyme on muscle fiber takes place in the range 100–150° F. The following table shows the temperature at which specific enzymes act on collagen and on muscle fiber:

| Enzyme | Temperature of Greatest Activity on Connective Tissue, ° F. | Temperature of Greatest Activity on Muscle Fiber, ° F. |
| --- | --- | --- |
| Bacterially-derived enzyme | 130–160 | 100–150 |
| Proteolytic enzyme derived from fungal source | 130–150 | 100–150 |
| Papain | 140–180 | 100–180 |
| Ficin | 140–180 | 130–160 |
| Bromelin | 140–160 | 140–160 |
| Fungal Protease | 130–140 | |

It should be noted that as the temperature of maximum activity of a given enzyme on a particular type of tissue is exceeded, enzyme activity decreases markedly until at higher temperatures the enzyme is inactivated.

It is clear from the foregoing that the preferred enzyme composition is one which has a high degree of activity in reducing or softening collagen and elastin which are found in the connective tissue but less activity against muscle fiber. Also, for a given enzyme preparation it is desirable to first determine the temperature range within which the activity in reducing or softening collagen is greatest. It is thus possible to insure a high degree of breakdown of connective tissue with a minimum of enzyme activity on muscle fiber. In view of these considerations it is not possible to define a specific range of temperatures within which it is desirable to heat the meat-water-enzyme solution inasmuch as the amount of heating, both with respect to the maximum temperature attained and the time during which this temperature is maintained, will vary considerably with the specific enzyme employed. It should also be understood that the type of meat being treated will have an effect upon the conditions under which the meat separation step is carried out. In general, it can be stated that the heating step should take place at a temperature in the range 100–190° F. However, it is desirable to heat the mixture of enzyme bones and water to around 150–180° F. in order to insure that enzyme action on muscle fiber is minimized.

A device designed to accomplish the process is shown diagrammatically in FIGURE 1 wherein a combined kettle and agitator means shown generaly at 10, for thoroughly agitating a water solution containing enzyme and bones having meat attached thereto, is illustrated. The agitator portion is driven by a motor 11 and the kettle is equipped with a discharge means 12 for removal of pieces of bone. A pump 13 is employed to remove the meat-liquid slurry from the kettle portion of means 10 through conduit 14 and force the slurry via a three-way valve 17, either to an intermediate settling tank 15, from whence the slurry returns to the agitator kettle by means of overflow trough or conduit 16; or through a conduit 18 to a separating tank 19, provided with agitating means 20 and drive motor 21, and thence through a conduit 22 to a centrifuge 23. In the intermediate settling tank 15 bone particles present will drop to the bottom and the slurry is recirculated to the container or kettle 10. As illustrated in FIGURE 1 valve 17 is initially positioned to direct slurry through a conduit 24 to the intermediate tank 15 and the slurry containing small pieces of bone is delivered into the top of the tank. The bone particles settle to the bottom while the liquid is returned to the agitator kettle through pipe 16, which is located adjacent the top of the tank away from any accumulated bone particles. An exit door in the tank (not shown) is provided for removal of accumulated bone particles.

The three-way valve 17 may be repositioned to permit bypassing of this settling tank 15 after the meat is substantially removed from the bones. After inactivation of the enzyme, all of the slurry is pumped from the kettle through valve 17 and conduit 18 to the separating tank 19. The separating tank is equipped with suitable agitating means 20 driven by a motor or other source of power 21. Gentle mixing of the slurry is effected in the separating tank and further bone particles are separated out by gravity. Bone particles may be removed periodically through a trap discharge door 25 located at the lowest point in the tank 19. The slurry is then conveyed by pump 26 through conduit 22 to a further separating means, such as a basket centrifuge 23, where suspended meat particles are removed, and the fat-water effluent is available, if desired, for further clarification to recover the fat.

Referring more specifically to the combined kettle and agitator means 10, FIGURE 2 is a detailed side view partly in section of that portion of the present apparatus. The kettle portion includes a jacketed or double wall tank 30 equipped with an upper lift-off cover 31 and a hinged dump door 32 at the lower discharge means 12 (shown open in FIGURE 2). Mounted within the housing is the agitator portion including a generally cylindrical basket 33 carried on a shaft 34 which is operatively associated through packing glands 35 and coupling 36 to motor 11. The cylindrical basket contains perforations 37 and a loading-unloading door 38. The basket 33 may be stopped in a position aligning door 38 with the discharge means 12, to enable removal of processed bone segments following the emptying of tank 30 through conduit 14. Alternately the basket can be stopped with the door 38 directed upwardly whence meaty bones may be charged therethrough with a removable loading chute 39 (shown in phantom in FIGURE 3). The tank or housing may be adapted with an entry passageway 40 for direct steam injection into the basket of the agitator, and/or a double wall steam jacket 41, or the like, may be used. Outlet conduit 14 and recycle conduit 16 connections are located at the bottom and top of tank 30, respectively.

In FIGURE 3, the hinged door 38 is shown in closed position (open position indicated in phantom), and a hydraulic cylinder 42 for actuating the dump door is illustrated.

In operation scrap bones with attached meat are loaded inside the agitator basket 33 and water solution of the enzyme is placed in the kettle. Door 38 is closed and the cover 31 is positioned, and the mixture is heated and subjected to a rolling action by introducing steam while the basket 33 is rotated. This rolling action causes the bones to be moved both with respect to each other and with respect to the solution. The bones act as abrasives to one another; and the meat which has been loosened by the enzyme action on the connective tissue holding the meat to the bone is freed and passes through the perforations 37 to flow with the liquid solution. As the speed of agitation is increased and enzyme concentration is decreased, the meat is removed in chunks of increased size. A slurry of meat and enzyme solution is thus formed and is circulated between the kettle 30 and settling tank 15 until substantially all meat has been removed from the bones in basket 33, at that time all of the slurry is completely removed from the kettle tank 30 to the separating tank 19 and thence to the centrifuge 23, thereafter the basket is stopped and bones unloaded by aligning and opening both unloading door 38 and the kettle dump door 32.

While the following examples are intended to illustrate specific embodiments of the invention, they are to be considered in no way limitative:

*Example I*

A batch of 6.37 pounds of chicken necks and backs and 8 pounds of water containing 10 milligrams papain for each pound of chicken parts and water was heated during vigorous rolling agitation in an agitator. The mixture was heated to 160° F. and the temperature was maintained between 160–170° F. for 1 hour with constant rolling agitation. At the end of this time, the temperature was increased to about 210° F. and held at this level for about 20 minutes. After removal of the bone particles by gravity and separation of the meat from water, the recovered meat product was examined. It was found that the meat was recovered in the form of striated tissue. The back and neck bones were weighed and it was discovered that there was a 54% reduction in the weight of the backs and necks.

*Example II*

A charge of 6.19 pounds of chicken necks and backs and 8 pounds of water containing 20 milligrams papain per pound of mixture was heated and agitated in the same manner as that set forth in Example I above. The percent meat removal was calculated to be 53%.

A similar run conducted in the same fashion with the exception that the enzyme concentration was increased to 40 milligrams per pound of mixture resulted in a yield of 69% meat and the bones were absolutely devoid of meat. However, the slurry obtained possessed a bitter flavor. Since this bitter flavor, which results from some peptonization, is soluble in the aqueous portion of the slurry, the bitterness is removed when the meat is separated from the water.

*Example III*

A mixture of 12 pounds water and 5 pounds crushed beef bone was placed in a steam jacketed agitator kettle and papain in a concentration of 40 milligrams per pound of the beef bone-water mixture was added. The mixture was subjected to rolling agitation during heating to about 160° F. The temperature was maintained at about 160–170° F. for 45 minutes. Inactivation was obtained by heating at about 205° F. for 20 minutes. The reduction in weight of the bone charge was about 50%.

*Example IV*

A mixture of 436 pounds of fowl necks and 456 pounds of water was charged into the basket agitator kettle. A quantity of papain amounting to 20 milligrams per pound of mix was added. The temperature of the solution was raised to about 160° F. and the bones having the meat attached thereto were subjected to a rolling agitation. The temperature was held between 160° F. and 170° F. for 40 minutes and then elevated to 212° F. and held at the boiling temperature for 20 minutes. The meat-water slurry was separated from the bone and bones which were practically clean of particles were weighed. The decrease in the weight of the bones over the original weight of the fowl necks was 68.6%. The meat after separation from the water slurry is essentially in its original striated form. The separated water-aqueous solution was practically clear, indicating that it contained a very little solubilized protein.

With the basket-type agitator shown in the drawings, the water can surround and pass through the basket and pieces of meat can pass out of the basket into the bottom of the kettle. The heating of the bone-water-enzyme mixture is generally carried out for about 30 minutes to about 1 hour while the enzyme inactivation step is carried out at about the boiling temperature of the mixture. The meat which is detached from the bone is classified by a settling procedure wherein the bones are permitted to gravitate to the bottom and the meat, water and fat layer can be separated. It is apparent that the enzyme-water-meat-containing bone mixture should be heated to a temperature and for a time sufficient to effect removal of the meat from the bone, but not sufficient to cause peptonization and resultant bitter flavors. If the mixture is heated too long or at too high a temperature, there is some development of bitterness in the product, although these flavor materials are water-soluble and are for the most part removed during the centrifugation step. Duration of the heating period at a given temperature is easily determined by observing how much of the meat is removed from the bones. When the meat is substantially removed from the bones the heat and agitation is terminated. As little as 15 minutes heating will be sufficient in isolated cases and up to about 4 hours will be required in others. It has been found that at the better working temperatures the heating is carried out for about 30–90 minutes.

Obviously many modifications and variations of the invention as hereinbefore set forth may be made without departing from the spirit and scope thereof, and therefore only such limitations are to be imposed as are indicated in the appended claims.

We claim:

1. Apparatus for removing meat from bones having meat attached thereto including, in combination: a container equipped with heating and agitating means and adapted to hold meat-containing bones and liquid, a settling tank communicating with said container whereby liquid-containing meat and bones may be transported from the bottom of said container into the top of said settling tank, a separating means communicating with said container, said separating means being adapted to effect separation of bone particles from liquid-containing meat, a valve connected between said container and both said settling tank and said separating means, said valve being positionable to first recycle liquid-containing meat through said container and settling tank, and then to deliver liquid-containing meat from said container to said separating means, and centrifuge means connected with said separating means to permit separation of liquid from solid meat particles.

2. Apparatus for removing meat from bones having meat attached thereto including, in combination: container means equipped with heating means and adapted to hold liquid and meat-containing bones, agitating means constructed and arranged to effect a rolling action of said meat-containing bones within said container means whereby to agitate said meat-containing bones in said liquid, settling means communicating with said container means whereby said liquid-containing meat and bones may be transported from said container means into said settling means to separate bones from said liquid by gravity, a separating means communicating with said container means, said separating means being adapted to effect further separation of bone particles from liquid-containing meat, a valve connected between said container and both said settling means and said separating means, said valve being positionable to first recycle liquid-containing meat through said container and settling means, and then to deliver liquid-containing meat from said container to said separating means, and a second separating means connected to said first separating means to permit separation of solid meat particles from said liquid.

3. Apparatus for removing meat from bones having meat attached thereto, including: a container equipped with heating means and agitating means constructed and arranged to effect a rolling action of said meat-containing bones and a liquid within said container, a settling tank wherein liquid, bones, and meat are introduced and bones settled by gravity, a conduit connected between the bottom of said container and the top of said settling tank, means for recycling liquid-containing meat from said settling tank to said container, means for separating meat-containing liquid into a liquid phase and a meat phase, and valve means in said conduit for first directing material from said container to said settling tank and then by passing said settling tank and connecting said container with said means for separating meat-containing liquid.

References Cited by the Examiner
UNITED STATES PATENTS

| | | | |
|---|---|---|---|
| 1,844,347 | 2/1932 | Chapman | 99—348 |
| 2,450,398 | 9/1948 | Sanders. | |
| 2,742,488 | 4/1956 | De Fault. | |
| 2,828,018 | 3/1958 | Chayen | 146—222 |
| 3,017,661 | 1/1962 | Zartman | 17—45 |

SAMUEL KOREN, *Primary Examiner.*

LUCIE H. LAUDENSLAGER, *Examiner.*